P. F. SHERMAN.
COMBINATION MEASURING DEVICE.
APPLICATION FILED AUG. 27, 1917.
1,263,945.
Patented Apr. 23, 1918.
2 SHEETS—SHEET 1.
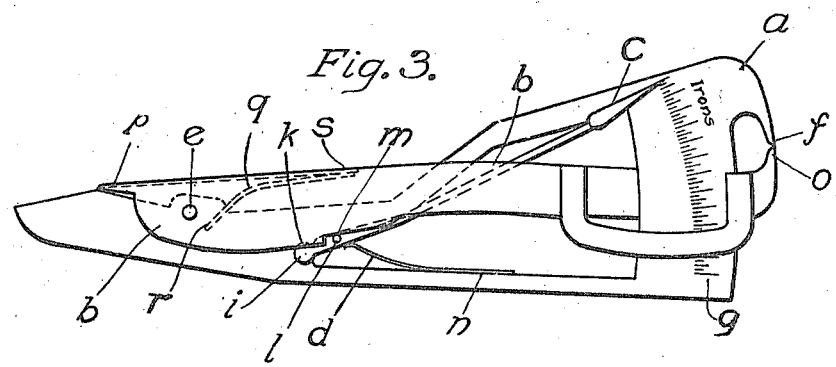
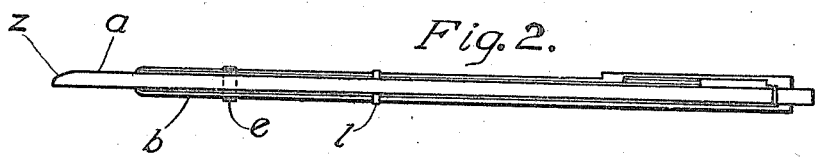
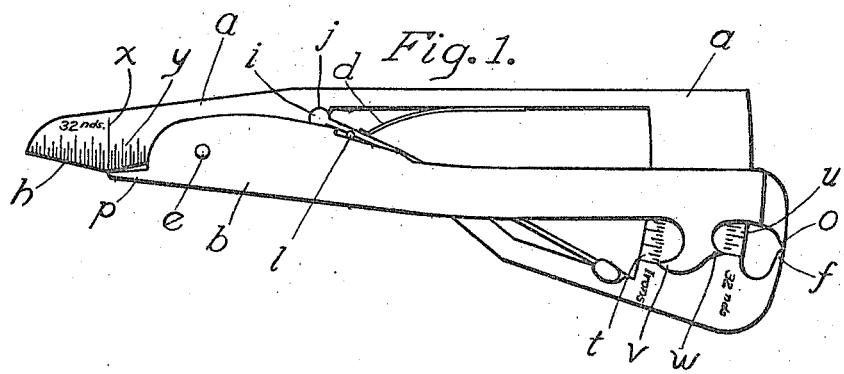
WITNESSES:
Nellie Raphael
Ida Callum
INVENTOR.
Percy F. Sherman
BY
Charles W. Lovett
ATTORNEY.

P. F. SHERMAN.
COMBINATION MEASURING DEVICE.
APPLICATION FILED AUG. 27, 1917.

1,263,945.

Patented Apr. 23, 1918.
2 SHEETS—SHEET 2.

WITNESSES:
Nellie Raphael
Ida Callum

INVENTOR.
Percy F. Sherman
BY
Charles W. Lovett
ATTORNEY.

UNITED STATES PATENT OFFICE.

PERCY F. SHERMAN, OF PITTSFIELD, MASSACHUSETTS.

COMBINATION MEASURING DEVICE.

1,263,945.  Specification of Letters Patent.  Patented Apr. 23, 1918.

Application filed August 27, 1917. Serial No. 188,313.

*To all whom it may concern:*

Be it known that I, PERCY F. SHERMAN, citizen of the United States, residing at Pittsfield, in the county of Merrimack and State of New Hampshire, have invented certain new and useful Improvements in Combination Measuring Devices, of which the following is a specification.

My invention relates to combination measuring devices for use in determining the thickness of leather or other various commodities, and the measuring of distances on soles, and has for its objects, the providing of an easy, speedy and accurate means of ascertaining the length of lip, width of channel, width of between substances, width of shoulder, thickness of lip or depth of channel, and the measurements of between substances in all kinds of welt, turn and McKay soles, also the thickness of soles or other material.

Figure 4:
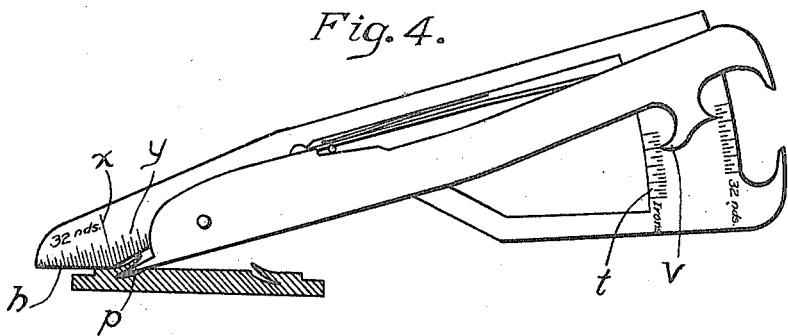
Figure 5:
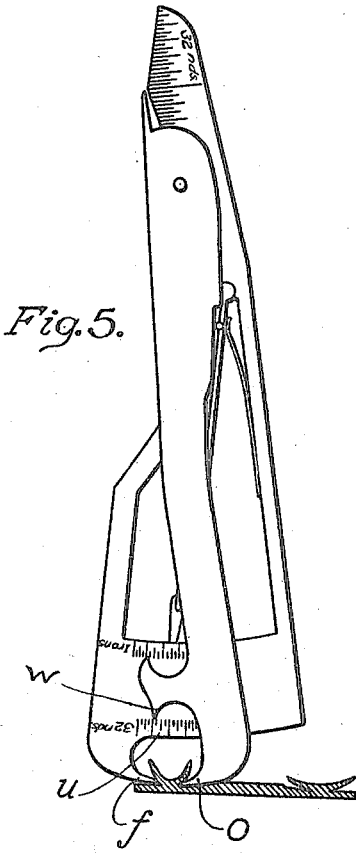
Figure 6:
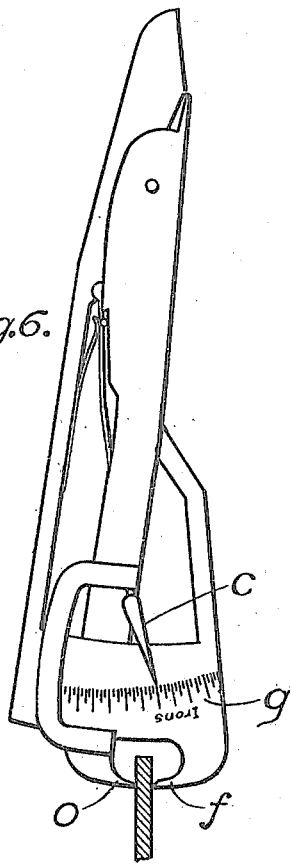

I attain the objects mentioned by the mechanism illustrated in the accompanying drawing in which Figure 1 shows a side view of my device. Fig. 2 shows a bottom view, and Fig. 3 shows a side view opposite that shown in Fig. 1. Fig. 4, is a view illustrating the use of the tool when measuring the thickness of a lip and depth of a channel. Fig. 5, is a view showing another use of the tool, and Fig. 6, is still another view showing a further use of the tool.

Similar letters refer to similar parts throughout the several views.

My device comprises substantially the following parts:

a. The measuring stick. Which it will be noted extends from end to end of my device, and is by far the largest portion thereof.

b. The lip carrying, gage forming, portion.

c. The scale indicator.

d. The operating spring.

e. The connecting rivet upon which the parts a and b hinge.

The measuring stick A, has at its larger end a pronged tooth $f$. Upon the same end is engraved, in irons, a measuring scale $g$. On its opposite end is the channel opener $z$ formed by beveling or rounding one side of the stick $a$ at its end to form a dull knife edge, which can be readily inserted in a slit to open the channel.

When my device is assembled the portion $a$ is inserted between the spaced sides of the lip carrying, gage forming, portion $b$, as shown in Fig. 2.

On the measuring stick $a$ is engraved, in thirty-seconds of an inch, the measuring scales $h$ and $y$, the two being divided by the high center line $x$ as shown in Fig. 1. The scale indicator $c$ is rounded at its end $i$, and held in position within the socket $j$, by the overlapping sides of the portion $b$, at $k$.

The scale indicator is provided with the projections L, extending from both sides thereof and against which the edges of the portion $b$ contact at $m$.

The measuring stick $a$ has secured to it at $n$ the spring $d$, which spring is tensioned to press against the indicator $c$, holding said indicator $c$ with its operating extensions $l$ against the sides of the portion $b$.

The portion $b$ at its hinged end is provided with the lip $p$, lying adjacent to one edge of the indicator $a$, and adapted to coöperate with said edge to caliper the thickness of a channel lip on a sole, the extreme end of said lip only extending to a line $x$ between the scales $y$ and $h$ marked on one side of the scale $a$.

The normal position of rest of the instrument, with the prong tooth $f$ against the prong tooth $o$, is assured by the spring $q$, firmly held in a prepared pocket R on the measuring stick $a$, which spring exerts its force on the interior of the portion $b$ at $s$.

The measuring stick $a$ has also engraved thereon a scale in irons $t$, and also a measuring scale in 32nds of an inch at $u$. Against the scale $t$ the indicator $v$ registers, and against the scale $u$ the indicator $w$ registers, the indicators $v$ and $w$ being formed upon the portion $b$.

In operation the indicator $c$ is timed to move five times faster than the pronged teeth $f$ and $o$ as they open. This allows the use of sufficiently large scale to insure the measurements being easily and readily seen with the naked eye.

The thickness of soles is measured by inserting the sole between the pronged teeth $o$ and $f$, the thickness thereupon being registered by the scale indicator $c$ upon the scale $g$. (See Fig. 6.) The thickness of the lip and depth of channel are measured by inserting the extension lip $p$ into the channel, whereupon the thickness of the lip is registered by the indicator $v$ in irons upon the scale $t$, while the distance from the bottom of the channel to the edge of the lip is indicated in 32nds of an inch upon the scale $y$. The between substance and width of shoulder are indicated in 32nds of an inch upon the scale $h$, (as shown in Fig. 4).

In determining the measurements of between substances on what is known as gem channels, the pronged teeth $f$ and $o$ grip the channel as would a pair of calipers. (See Fig. 5.) The measurement is then registered by the indicator $w$ upon the scale $u$ in 32nds of an inch.

In this manner the length of lips, width of between substances, width of shoulders, thickness of lips, or depth of channels, as well as the between substances in irons or 32nds of an inch is easily ascertained.

Having thus described my invention what I claim as new, and desire to secure by Letters Patent of the United States is:

1. In a measuring device of the character described, a measuring stick having a pronged tooth at one end, a scale on one side at the same end, and a socket intermediate its ends, a pivoted member mounted on said measuring stick and provided with a pronged tooth to coöperate with the tooth on the measuring stick, and also spaced sides extending over said socket, a scale indicator having one of its extreme ends pivoted in said socket and retained therein by the spaced sides, and the other end of the scale indicator being formed to provide a pointer to coöperate with the scale on the measuring stick, said scale indicator also having projections to engage the edges of the spaced sides of the pivoted member by which the indicator is operated, and a spring for returning said scale indicator to normal position.

2. In a measuring device of the character described, a measuring stick having a pronged tooth at one end, a single scale on one side at the same end, and a pair of scales on its opposite side also at the same end, a pivoted member pivoted intermediate its ends to said measuring stick and provided at one end with a pronged tooth which coöperates with the pronged tooth of the measuring stick, said pivoted member also having a pair of indicating points which coöperate with said pair of scales, and at its other end being provided with a lip which coöperates with a portion of the edge of said measuring stick, and a scale indicator pivoted to said measuring stick and constructed to coöperate with said single scale, and provided with projections engaged by said pivoted member to operate the indicator.

3. In a measuring device of the character described, a measuring stick having a pronged tooth at one end, a single scale on one side at the same end, and a pair of scales on its opposite side also at the same end, a pivoted member pivoted intermediate its ends to said measuring stick and provided at one end with a pronged tooth which coöperates with the pronged tooth of the measuring stick, said pivoted member also having a pair of indicating points which coöperate with said pair of scales, and at its other end being provided with a lip which coöperates with a portion of the edge of said measuring stick, said measuring stick also being provided with a pair of scales adjacent said lip which simultaneously indicate other dimensions of the part measured between the lip and the coöperating portion of the edge of the measuring stick, and a scale indicator pivoted to said measuring stick and constructed to coöperate with the single scale on said stick, said scale indicator being provided with projections engaged by said pivoted member to operate the indicator.

In testimony whereof I affix my signature in presence of two witnesses.

PERCY F. SHERMAN.

Witnesses:
E. F. ENGLISH,
NATT A. CRAM.

Copies of this patent may be obtained for five cents each, by addressing the "Commissioner of Patents, Washington, D. C."